United States Patent [19]

Koike et al.

[11] Patent Number: 5,017,227
[45] Date of Patent: May 21, 1991

[54] RECORDING LIQUID AND INK-JET RECORDING PROCESS USING SAME

[75] Inventors: Shoji Koike; Tsuyoshi Eida, both of Yokohama; Takao Yamamoto, Isehara, all of Japan

[73] Assignee: Canon Kabushiki Kaisha, Tokyo, Japan

[21] Appl. No.: 385,153

[22] Filed: Jul. 26, 1989

[30] Foreign Application Priority Data

Jul. 26, 1988 [JP] Japan ................. 63-184744

[51] Int. Cl.[5] .................................. C90D 11/00
[52] U.S. Cl. ........................... 106/22; 106/20
[58] Field of Search ...................... 106/20, 22

[56] References Cited

U.S. PATENT DOCUMENTS

| | | | |
|---|---|---|---|
| 4,295,889 | 10/1981 | Eida et al. | 106/22 |
| 4,365,998 | 12/1982 | Sugiyama et al. | 106/22 |
| 4,409,040 | 10/1983 | Tabayashi et al. | 106/20 |
| 4,500,355 | 2/1985 | Shimada et al. | 106/22 |
| 4,512,807 | 4/1985 | Ogawa et al. | 106/22 |
| 4,732,613 | 3/1988 | Shioya et al. | 106/22 |
| 4,761,180 | 8/1988 | Askeland et al. | 106/22 |
| 4,771,129 | 9/1988 | Kawashita et al. | 106/22 |
| 4,791,165 | 12/1988 | Bearss et al. | 106/22 |
| 4,793,860 | 12/1988 | Murakami et al. | 106/22 |
| 4,864,324 | 9/1989 | Shirota et al. | 106/20 |

Primary Examiner—William R. Dixon, Jr.
Assistant Examiner—Helene Klemanski
Attorney, Agent, or Firm—Fitzpatrick, Cella, Harper & Scinto

[57] ABSTRACT

A recording liquid comprising dyes and a liquid medium, wherein the dyes include a black dye and at least one water-soluble dye of a magenta dye and a yellow dye in combination. The black dye is selected from the group, C.I. Food Black 1, C.I. Acid Black 140 and C.I. Acid Black 187.

28 Claims, 1 Drawing Sheet

FIGURE
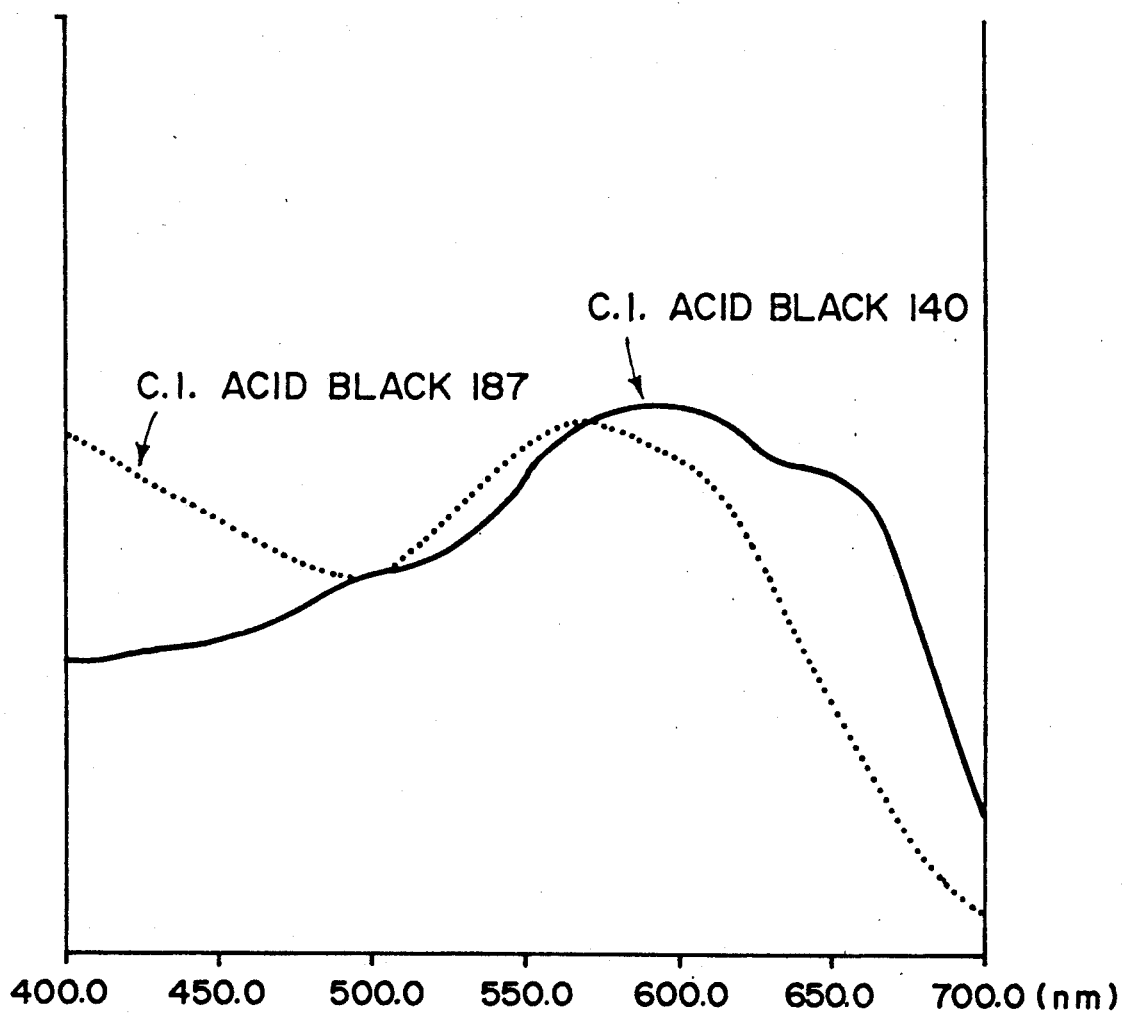

RECORDING LIQUID AND INK-JET RECORDING PROCESS USING SAME

BACKGROUND OF THE INVENTION

1. Field of the Invention

The present invention relates to a novel recording liquid improved in indoor color change resistance and pitch-blackness, and an ink-jet recording process using the recording liquid.

2. Related Background Art

Water-based inks comprising a water-soluble dye dissolved in a water-based medium have been hitherto used as inks for fountain pens and felt pens and as inks used for ink-jet recording. In these water-based inks, water-soluble organic solvents are commonly added so that pen points or ink ejection nozzles can be prevented from being clogged with ink.

It is required for these conventional inks to give an image with a sufficient density, not to cause any clogging at pen points or nozzles, to have good drying properties on recording mediums, to suffer less feathering, to have excellent shelf stability, and, particularly in ink-jet recording systems utilizing heat energy, to have excellent thermal resistance. It is also required for the image formed to have a sufficient light-resistance and water resistance.

Inks with various hues are also prepared from dyes with various hues. Of these, black inks, which are used in both monocolor and full-color images, are most important inks. As dyes for these black inks, C.I. Food Black 2 has been mainly used taking account of various performances (see Japanese Patent Application Laid-Open Nos. 59-93766 and 59-93768).

Incidentally, among the above various required performances, what has been particularly a serious question in recent years is the weathering resistance of images.

In regard to the weathering resistance of images, what hitherto has been a mainly serious question is the problem of color fading due to direct sunlight or any kind of illumination (so-called light-resistance). Such a problem of color fading has been attempted to be resolved by the selection of dyes having superior light-resistance.

Recently, however, the problem of color changes of images has become important, in addition to the above discussed problem of color fading. Namely, images formed by conventional inks have not only the problem of color fading but also the problem of color changes. The color changes refer to changes in hues while there are less changes in density. In black inks particularly used in the largest amount, there is a problem of the browning that black turns brown. In particular, in the instance of full-color images, this browning results in a rapid lowering of image quality.

This problem of browning occurs even in a room without exposure to direct sunlight. The browning is also accelerated depending on the types of recording mediums on which images are formed, and this problem of browning has been unavoidable with respect and the C.I. Food black 2 that has been hitherto widely used.

In particular, in the instance of so-called coated papers comprising a substrate such as paper and an ink-receiving layer which contains a pigment and a binder and which is formed on the substrate, the browning may seriously occur even with use of inks that may cause less problem of color change in the instance of plain papers. This problem has been unresolved by the mere selection of dyes having superior light-resistance.

SUMMARY OF THE INVENTION

Accordingly, an object of the present invention is to provide a recording liquid that can satisfy the performances commonly required as mentioned above and that also may seldom undergo color changes on the coated papers, and an ink-jet recording process using this liquid.

The present invention provides a recording liquid comprising dyes and a liquid medium for dissolving the dye, wherein the dyes comprises a black dye and a toning water-soluble dye in combination, the black dye being selected from the group consisting of C.I. Food Black 1, C.I. Acid Black 140 and C.I. Acid Black 187.

The present invention also provides an ink-jet recording process comprising making a record by applying droplets of a recording liquid to a recording medium having a pigment-coated layer, wherein the recording liquid comprises a black dye and a toning water-soluble dye in combination, the black dye being selected from the group consisting of C.I. Food Black 1, C.I. Acid Black 140 and C.I. Acid Black 187.

BRIEF DESCRIPTION OF THE DRAWING

The FIGURE illustrates absorption spectra for C.I. Acid Black 187 and C.I. Acid Black 140.

DETAILED DESCRIPTION OF THE PREFERRED EMBODIMENTS

The present invention will be described below in more detail by giving preferred embodiments.

The black dye used in the recording liquid, or ink, of the present invention is selected from at least one dye of the group consisting of C.I. Acid Black 140, C.I. Acid Black 187 and C.I. Food Black 1. These black dyes are all commonly used in the form of sodium salts of water-soluble groups such as a sulfonic acid group.

In this invention, however, they are not limited to these sodium salts, and their counter ions may also include potassium, lithium or ammonium. The present invention embraces even the dyes containing these other counter ions.

Of the above three types of dyes, C.I. Food Black 1 is particularly preferred since it gives a high optical density of recorded images and also has excellent color change resistance.

Of the above three types of dyes, C.I. Acid Black 140 and C.I. Food Black 1 have a bluish black color. When used alone, these dyes seldom cause the problem of browning, but may result in a lack of pitch-blackness of the image formed. Thus, when these dyes are selected, an additional dye as exemplified by a different type of water-soluble dye of magenta or yellow is required to be used in combination so that the bluish tone may be cancelled.

C.I. Acid Black 187 has a greenish black color. When used alone, this dye seldom causes the problem of browning like the above, but may result in lack of pitch-blackness of the image formed. Thus, when this dye is selected, an additional dye as exemplified by a different type of water-soluble dye of magenta or yellow is required to be used in combination so that the greenish tone may be cancelled.

Most yellow dyes and magenta dyes, however, although they can improve the pitch-blackness when used in combination with the above black dyes, may disadvantageously bring about lowering of the characteristics, such as color change resistance inherent in the above black dyes or the optical density (O.D.) at a given dye density. Such lowering is brought about depending on the proportion of the dyes used in combination.

Accordingly, the above black dye is mixed in a proportion of from 40 to 95% by weight, and preferably from 45 to 90% by weight, based on all the dyes contained in the ink. A proportion more than 95% by weight, of the black dye may make it impossible to achieve a sufficient improvement in the pitch-blackness. A proportion lower than 40% by weight may also result in lowering of the color change resistance and the optical density at a given dye density.

The water-soluble dye used in combination with the black dye used in the present invention may preferably include direct dyes, acid dyes and reactive dyes. Although tones are not particularly limited, yellow dyes and magenta dyes are preferred. Additionally, the yellow dyes and magenta dyes may be even used alone to obtain a sufficient effect. The both, however, may particularly preferably be used in combination, so that the pitch-blackness can be matched to its delicate region.

When the yellow dyes and magenta dyes are used in combination, a preferred mixing ratio of the former and the latter ranges from 1:10 to 10:1. When both dyes are used outside of the range in combination, there is a case that insufficient pitch-blackness is depending on the dye. concentration of ink and the kind of a recording medium, although in such combination use, there is not a problem in general.

The above dyes used in combination with the black dye specifically includes the following:

Magenta dyes:

C.I. Direct Red 2, 4, 9, 23, 31, 37, 39, 62, 76, 79, 80, 81, 83, 83:1, 84, 89, 92, 95, 111, 207, 211, 212, 218, 221, 223, 224, 225, 226, 227, 229, 233, 239, 240, 241, 242, 243;

C.I. Acid Red 1, 6, 8, 9, 14, 18, 26, 27, 32, 35, 37, 42, 52, 57, 66, 73, 80, 82, 85, 87, 88, 89, 92, 97, 97:1, 106, 111, 114, 118, 119, 127, 128, 131, 134, 138, 143, 145, 151, 154, 158, 164, 172, 183, 186, 195, 198, 211, 214, 215, 217, 221, 225, 226, 227, 228, 249, 251, 252, 254, 256, 257, 260, 261, 263, 265, 266, 274, 276, 277, 278, 296, 299, 300, 301, 307, 315, 316, 317, 318, 336, 337, 341, 348, 355, 357, 359, 361, 362, 366, 379, 396, 402, 404, 405, 407, 414, 415, 416;

C.I. Food Red 1, 2, 4, 8, 11, 12, 13, 14; and a dye represented by the following Formula (A), disclosed in Japanese Unexamined Patent Application Laid-Open No. 59-78273.

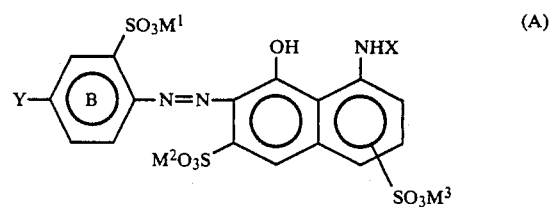

wherein Y represents a hydrogen atom, a methyl group, a methoxy group, an acetylamino group or a nitro group, or Y forms a benzene ring together with the carbon atom at the 3-position of the benzene ring B; X represents an acetyl group, a benzoyl group, a p-toluenesulfonyl group or a 4-chloro-6-hydroxy-1,3,5-triazin-2-yl group; and $M^1$, $M^2$ and $M^3$ each represent a base selected from the group consisting of an alkali metal, ammonium and amines.

Examples of the dye of Formula (A) are shown in Table A.

TABLE A

| | Structural formula | Main absorption peak (nm) |
|---|---|---|
| No. 1 | | 517 & 530 |
| No. 2 | | 525 & 549 |
| No. 3 | | 530 |
| No. 4 | | 536 |

TABLE A-continued

| | Structural formula | Main absorption peak (nm) |
|---|---|---|
| No. 5 | | 539 |
| No. 6 | | 527 & 547 |
| No. 7 | | 519 & 539 |
| No. 8 | | 528 |
| No. 9 | | 505 & 519 |
| No. 10 | | 513 & 538 |
| No. 11 | | 515 & 536 |
| No. 12 | | 507 & 528 |

TABLE A-continued

| | Structural formula | Main absorption peak (nm) |
|---|---|---|
| No. 13 | (naphthalene-SO$_3$Na)-N=N-(naphthalene with HO, NaO$_3$S, SO$_3$Na, NHSO$_2$-C$_6$H$_4$-CH$_3$) | 517 |
| No. 14 | (C$_6$H$_4$-SO$_3$Na)-N=N-(naphthalene with HO, NaO$_3$S, SO$_3$Na, NH-triazine(OH,Cl)) | 522 & 546 |
| No. 15 | (H$_3$C-C$_6$H$_4$-SO$_3$Na)-N=N-(naphthalene with HO, NaO$_3$S, SO$_3$Na, NH-triazine(OH,Cl)) | 530 & 563 |
| No. 16 | (C$_6$H$_4$-SO$_3$·N(H)(CH$_2$CH$_2$OH)$_3$)-N=N-(naphthalene with HO, (HOH$_2$CH$_2$C)$_3$(H)N·O$_3$S, SO$_3$·N(H)(CH$_2$CH$_2$OH)$_3$, NH-triazine(OH,Cl)) | 531 & 560 |
| No. 17 | (naphthalene-SO$_3$Na)-N=N-(naphthalene with HO, NaO$_3$S, SO$_3$Na, NH-triazine(OH,Cl)) | 519 & 549 |
| No. 18 | (H$_3$CO-C$_6$H$_3$-SO$_3$Na)-N=N-(naphthalene with HO, NaO$_3$S, SO$_3$Na, NHSO$_2$-C$_6$H$_4$-CH$_3$) | 525 |

TABLE A-continued

| | Structural formula | Main absorption peak (nm) |
|---|---|---|
| No. 19 | | 518 |
| No. 20 | | 521 |
| No. 21 | | 513 |
| No. 22 | | 528 |
| No. 23 | | 503 & 524 |
| No. 24 | | 521 & 529 |

Yellow dyes:

C.I. Direct Yellow 8, 9, 11, 12, 22, 27, 28, 33, 39, 44, 50, 53, 58, 68, 86, 87, 95, 96, 98, 100, 106, 110, 130, 132, 142, 144, 157, 161, 163;

C.I. Acid Yellow 1, 3, 7:1, 11, 17, 17:1, 18, 19, 23, 25, 29, 36, 38, 40, 40:1, 42, 44, 44:1, 49, 54, 59, 61, 64, 65, 72, 73, 75, 79, 99, 104, 110, 114, 116, 117, 118, 119, 121, 127, 128, 129, 135, 137, 141, 143, 151, 155, 158, 159, 161, 169, 176, 184, 193, 194, 196, 197, 199, 204, 207, 218, 219, 220, 221, 227, 230, 232, 236, 241, 242; and C.I. Food Yellow 2, 3, 8, 13.

Of the above dyes, particularly preferred dyes are C.I. Direct Yellow 86 and 142 and C.I. Acid Yellow 23 as a yellow dye, C.I. Acid Red 227 and dyes represented by the general formula (A) as a magenta dye.

There are no particular limitations on the amount in using the above dyes, but, in general, they may be used at an amount of from 0.1 to 15% by weight, preferably from 0.3 to 10% by weight, and more preferably from 0.5 to 6% by weight of the total weight of the ink.

A water-based medium is used in the ink of the present invention. The water-based medium preferably comprises water or a mixed solvent of water with a water-soluble organic solvent. Particularly preferably used is the mixed solvent of water with a water-soluble organic solvent, containing as the water-soluble organic solvent, a polyhydric alcohol having the effect of preventing the ink from drying. As the water, it is preferred not to use commonly available water containing various ions, but to use deionized water.

The water-soluble organic solvent used by mixture with the water includes, for example, alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, such as ethylene glycol monomethyl or monoethyl ether, diethylene glycol monomethyl or monoethyl ether, and triethylene glycol monomethyl or monoethyl ether; lower dialkyl ethers of polyhydric alcohols, such as triethylene glycol dimethyl or diethyl ether and tetraethylene glycol dimethyl or diethyl ether; sulfolane, N-methyl-2-pyrrolidone, and 1,3-dimethyl-2-imidazolidinone.

Suitable solvents to be used are selected from the organic solvents as described above. Particularly important from the view point of preventing clogging by ink is glycerol or polyethylene oxide with a degree of polymerization of 2 to 6, such as diethylene glycol, triethylene glycol or tetraethylene glycol. Further taking account of image density and ejection stability, preferred are nitrogen-containing cyclic compounds or ether compounds of polyalkylene oxides. Still further taking account of responsiveness to frequency, it is preferred to use lower alcohols or surface active agents, which may be optionally used in combination. Thus, the solvent composition preferred in the present invention is a composition in which all sorts of the components as described above are contained in addition to the water.

The above water-soluble organic solvent may be contained in the ink in an amount of generally from 2 to 65% by weight, preferably from 3 to 62% by weight, and more preferably from 4 to 60% by weight, based on the total weight of the ink.

The water to be used may be in a proportion of not less than 35% by weight, and preferably not less than 45% by weight, of the whole ink. The amount of water of less than 35% may result in a large quantity of a low-volatile organic solvent remaining in the image formed, undesirably causing the problems of migration of dyes, feathering of images and so forth.

In addition to the above components, the ink of the present invention may also optionally contain pH adjustors, viscosity modifiers, surface tension modifiers, and so forth. The pH adjustors used in the above ink include, for example, all sorts of organic amines such as diethanolamine and triethanolamine, inorganic alkali agents such as oxides of alkali metals as exemplified by sodium hydroxide, lithium hydroxide and potassium hydroxide, organic acid salts such as lithium acetate, organic acids, and mineral acids.

The ink of the present invention, as described above, may preferably have at 25° C. physical properties of a viscosity of from 1 to 20 cP, and preferably from 1 to 15 cP; a surface tension of not less than 30 dyne/cm, and preferably not less than 40 dyne/cm; and a pH of approximately from 4 to 10.

The recording process of the present invention is characterized by using the ink described above, and there are no particular limitations on the recording system and recording mediums. Of these systems and mediums, particularly effective are an ink-jet system and a coated paper, respectively.

The ink-jet system may include any conventionally known systems, without any particular limitations. In the present invention, however, the system as disclosed in Japanese Patent Application Laid-Open No. 54-59936 is particularly useful, which is a system in which heat energy acts on an ink to cause therein an abrupt volume change, and the ink is ejected from a nozzle by the force of action attributable to this change in state.

In this system, conventional inks have tended to cause deposition of foreign matters on a heating head and thus to cause the problem of no ejection of ink. However, the ink of the present invention, since it does not cause such deposition of foreign matters, is feasible for stable recording.

As the recording medium used in the present invention, any recording medium can be used such as commonly available plain papers, wood free papers, coated papers, and plastic films for OHP. A remarkable effect can be obtained particularly when the coated papers are used.

The coated papers refer to those which are comprised of a plain paper or wood free paper used as a substrate, and provided on the surface thereof an ink-receiving layer comprising a pigment and a binder, aiming at improvements in the color-forming properties attributable to ink, sharpness, and dot shape.

In the case of these coated papers, those which employ as the pigment a fine pigment such as synthetic silica having a BET specific surface area of from 35 to 650 $m^2/g$ can provide images having excellent color-forming properties and sharpness. When conventional inks are used, although theoretical bases are not found, images formed particularly with black ink may seriously cause the problem of browning with lapse of time, and great problems are also caused in not only black monocolor images but also full-color images. Similar problems are also caused in recording mediums comprised of, like these coated papers, a paper substrate and provided thereon a thin layer comprising a pigment and a binder, where fibers of the paper that constitutes the substrate are present in this layer in a mixed state.

It was found that use of the ink of the present invention does not cause the problems of browning as discussed above even when monocolor images or full-color images are formed on the coated papers as mentioned above. Thus, the process according to the present invention can provide recorded images that do not bring about indoor color change for a long period of time, when using not only the coated papers employing the pigment having a BET specific surface area of from 35 to 650 $m^2/g$, but also coated papers employing a pigment having a BET specific surface area smaller than that, and also plain papers and any other recording mediums.

C.I. Food Black 1 (C.I. 28440) used in the present invention, whose chemical structure has been already identified, can be readily identified by analysis such as various chromatographic techniques.

The chemical structures of C.I. Acid Black 140 and 187 have not been identified. But, as shown in the Figure, according to the absorption spectra (400.0 to 700.0 nm) therefor at a concentration of about 50 ppm in an aqueous solution, the main peak for C.I. Acid Black 140 is at about 594 nm, and that for C.I. Acid Black 187 is at about 570 nm.

The main peak for C.I. Direct Red 227 at a concentration of 20 ppm in an aqueous solution is in the vicinity of about 540 nm, and its peak hight is 0.68 to 0.78. Its Rf value in a thin layer chromatography is 0.30 to 0.34 when an elution solvent of "N-butanol/pyridine/aqueous ammonia/water=8/4/4/3 (by volume)" is used.

EXAMPLES

The present invention will be described below in detail by giving Examples and Comparative Examples. In the following, the "(P)" means "parts by weight".

EXAMPLE 1

Components as shown below were mixed, thoroughly stirred and dissolved, followed by pressure filtration using Fluoropore Filter (trademark; available from Sumitomo Electric Industries, Ltd.) with a pore size of 0.45 μm, to prepare recording liquids of the present invention.

| No. | Dye (P) | Liquid medium (P) |
|---|---|---|
| 1 | C. I. Food Black 1 (2.7)<br>C. I. Direct Yellow 86 (1.4)<br>Dye No. 6 in Table A (0.9) | Diethylene glycol (30)<br>N-methyl-2-pyrrolidone (5)<br>Water (60) |
| 2 | C. I. Food Black 1 (2.2)<br>C. I. Direct Yellow 142 (1.2)<br>C. I. Acid Red 35 (0.6) | Glycerol (15)<br>Triethylene glycol monomethyl ether (1)<br>Pluronic L-44 (0.1) (tradename; a nonionic surfactant; available from Asahi Denka Kogyo K.K.)<br>Water (80) |
| 3 | C. I. Food Black 1 (2.3)<br>C. I. Acid Yellow 23 (1.2)<br>C. I. Direct Red 227 (1.5) | Glycerol (12)<br>N-methyl-2-pyrrolidone (3)<br>Emulgen PP150 (0.2) (tradename; a nonionic surfactant; available from Kao Corporation)<br>Water (80) |
| 4 | C. I. Acid Black 140 (2)<br>C. I. Direct Yellow 100 (1)<br>C. I. Reactive Red 23 (0.5) | Triethylene glycol (10)<br>Tetraethylene glycol dimethyl ether (4)<br>Ethanol (2)<br>Water (80.5) |
| 5 | C. I. Acid Black 140 (1.5)<br>C. I. Acid Yellow 49 (1)<br>C. I. Acid Red 37 (0.5) | Tetraethylene glycol (2)<br>Glycerol (6)<br>1,3-Dimethyl-2-imiazolidinone (15)<br>Ethanol (3)<br>Water (71) |
| 6 | C. I. Acid Black 140 (2.5)<br>C. I. Direct Yellow 86 (1.5)<br>Dye No. 1 in Table A (1) | Pentaethylene glycol (10<br>Isopropanol (5)<br>Water (80) |
| 7 | C. I. Acid Black 187 (3)<br>C. I. Direct Yellow 142 (0.2)<br>C. I. Acid Red 8 (1.0) | Diethylene glycol (30)<br>N-methyl-2-pyrrolidone (5) |

-continued

| No. | Dye (P) | Liquid medium (P) |
|---|---|---|
| 8 | C. I. Acid Black 187 (2.5)<br>C. I. Acid Yellow 23 (0.2)<br>C. I. Acid Red 35 (0.5) | Water (60.8)<br>Triethylene glycol (10)<br>Tetraethylene glycol dimethyl ether (4)<br>Ethanol (2) |
| 9 | C. I. Acid Black 187 (3.6)<br>C. I. Direct Yellow 86 (0.2)<br>Dye No. 7 in Table A (0.2) | Water (80.8)<br>Pentaethylene glycol (11)<br>Isopropanol (5)<br>Water (80) |

Comparative Examples 1 to 4

Comparative recording liquids with the following composition were prepared in the same procedures as Example 1.

| No | Dye (P) | Liquid medium (P) |
|---|---|---|
| 1 | C. I. Food Black 1 (5) | Diethylene glycol (30)<br>N-methyl-2-pyrrolidone (5)<br>Water (60) |
| 2 | C. I. Acid Black 140 (4) | Triethylene glycol (10)<br>Tetraethylene glycol dimethyl ether (4)<br>Ethanol (2)<br>Water (80) |
| 3 | C. I. Acid Black 187 (4) | Pentaethylene glycol (11)<br>Isopropanol (5)<br>Water (80) |
| 4 | C. I. Food Black 2 (2.7)<br>C. I. Direct Yellow 86 (1.4)<br>Dye No. 6 In Table A (0.9) | Diethylene glycol (30)<br>N-methyl-2-pyrrolidone (5)<br>Water (60) |

The inks of Examples 1 to 9 and Comparative Examples 1 to 4 were each set on an ink-jet printer BJ-80A (nozzle size; 50×40 μm: nozzle number: 24 manufactured by Canon) that utilizes a heating element as an ink ejection energy source, and printing was carried out on the following recording mediums A to C. Evaluation was made on clogging observed when the printing was stopped for a while and then again started, the performance of recovery from clogging observed when the printing was stopped for a long term and then again started, and optical density, color change resistance and pitch-blackness of prints. Results obtained are shown in Tables 1 and 2.

| | |
|---|---|
| Recording medium A(RMA) | Ink-jet coated paper, NM (trade name; available from Mitsubishi Paper Mills, Ltd.) |
| Recording medium B(RMB) | Ink-jet coated paper, FC-3 (trade name; available from Jujo Paper Co., Ltd. |
| Recording medium C(RMC) | Copy paper, Canon PAPER DRY (trade name; available from Canon Sales Inc.) |

Both the recording mediums A and B are coated papers containing silica on their surfaces.

Evaluation Method and Evaluation Criteria (1) Clogging observed when the printing was stopped for a while and then again started:

In respect of the clogging observed when the printing was stopped for a while and then again started, judgement was made on whether defective prints such as blurs and chips of characters are seen or not, when the printing was stopped after alphanumeric characters were continuously printed on the recording medium C using the printer filled with a given ink, and then the alphanumeric characters were again printed after the ink was left to stand for 10 minutes without stoppering or the like (at 20°±5° C. under 50±10% RH).

A: No defective prints were seen on all the characters.
B: Part of all the characters was blurred or chipped.
C: No characters were printed.

(2) Performance of recovery from clogging observed when the printing was stopped for a long term and then again started:

Judgement was made on how many times the operation for recovery had to be repeated to enable normal printing free from blurs or chips of characters, when the printing was stopped after alphanumeric characters were continuously printed on the recording medium C using the printer filled with a given ink, and the operation for recovery of the clogging of nozzles were carried out after the ink was left to stand for 7 days without stoppering or the like (at 60° C. under 10±5% RH).

A: Normal printing became possible after the recovery operation was made once to five times.
B: Normal printing became possible after the recovery operation was made six to ten times.
C: Normal printing became possible after the recovery operation was made eleven or more times.

(3) Optical density of prints:

Solid black patterns of 10 mm×30 mm were each printed on the recording medium A, and thereafter the optical density (O.D.) thereof was measured using a reflection densitometer (RD-918; manufactured by Macbeth Co.).

A: O.D.>1.3
B: 1.2≦O.D.≦1.3
C: O.D.<1.2

(4) Color change resistance:

Solid black patterns of 10 mm×30 mm were each printed on the recording mediums A, B and C. Thereafter, for promoting a color change, the print was left to stand for 30 minutes in a light-intercepted chamber in which the density of ozone was always kept within the range of 0.1±0.5% by volume, and the color differences ΔE*ab after and before the test were measured (according to JIS Z8730).

A: ΔE*ab<5
B: 5≦ΔE*ab≦10
C: ΔE*ab>10

(5) Pitch-blackness:

Tones of the above solid black patterns on the recording medium A were visually judged.

A: Substantially pure black.
C: Nearly black, but a certain hue is seen.

TABLE 1

| | (Evaluation results) | | | | | | | | |
| --- | --- | --- | --- | --- | --- | --- | --- | --- | --- |
| | Examples | | | | | | | | |
| Evaluation items | 1 | 2 | 3 | 4 | 5 | 6 | 7 | 8 | 9 |
| Clogging after stop of printing for a while | A | A | A | A | A | A | A | A | A |
| Recovery of clogging after stop of printing for a long term | A | A | A | A | A | A | A | A | A |
| Optical density of prints | A | A | A | A | A | A | A | A | A |
| Color change: (RMB) | A | A | A | A | A | A | A | A | A |
| resistance (RMB) | A | A | A | A | A | A | A | A | A |
| (RMC) | A | A | A | A | A | A | A | A | A |
| Pitch-blackness | A | A | A | A | A | A | A | A | A |

TABLE 2

| | (Evaluation results) | | | |
| --- | --- | --- | --- | --- |
| | Comparative Examples | | | |
| Evaluation items | 1 | 2 | 3 | 4 |
| Clogging after stop of printing for a while | A | A | A | C |
| Recovery of clogging after stop of printing for a long term | A | A | A | C |
| Optical density of prints | B | B | B | A |
| Color change resistance (A) | A | A | A | C |
| (B) | A | A | A | C |
| (C) | A | A | A | B |
| Pitch-blackness | C*1 | C*2 | C*2 | A |

*1: Bluish,
*2: Greenish

As described above, the present invention not only has achieved excellent performance of anti-clogging property of ink, which is commonly required, but also has made it possible to form superior images having excellent color change resistance and pitch-blackness.

We claim:

1. A recording liquid comprising:
   (a) a black dye selected from the group consisting of C.I. Food Black 1, C.I. Acid Black 140 and C.I. Acid Black 187;
   (b) at least one water soluble dye selected from the group consisting of a magenta dye and a yellow dye; and
   (c) a liquid medium for dissolving said dyes, wherein said black dye is present in a proportion of from 40 to 95% by weight based on the total weight of said dyes in said recording liquid.

2. A recording liquid according to claim 1, wherein said black dye is contained in a proportion of from 45 to 90% by weight based on all the dyes contained in said recording solution.

3. A recording liquid according to claim 1, wherein said liquid medium comprises water and a water-soluble organic solvent.

4. A recording liquid according to claim 3, wherein said water-soluble organic solvent is selected from the group consisting of glycerol and polyethylene oxide having a degree of polymerization of from 2 to 6.

5. A recording liquid according to claim 4, wherein said water-soluble organic solvent is contained in an amount of from 2 to 65% by weight based on the total weight of the recording liquid.

6. A recording liquid according to claim 1, wherein said yellow dye is selected from the group consisting of C.I. Direct Yellow 86, C.I. Direct Yellow 142 and C.I. Acid Yellow 23.

7. A recording liquid according to claim 1, wherein said magenta dye is selected from the group consisting of C.I. Direct Red 227 and a dye represented by the following Formula (A):

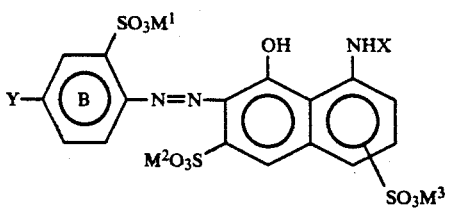

wherein Y represents a hydrogen atom, a methyl group, a methoxy group, an acetylamino group or a nitro group, or Y forms a benzene ring together with the carbon atom at the 3-position of the benzene ring B; X represents an acetyl group, a benzoyl group, a p-toluenesulfonyl group or a 4-chloro-6-hydroxy-1,3,5-triazin-2-yl group; and $M^1$, $M^2$ and $M^3$ each represent a base selected from the group consisting of an alkali metal, ammonium and amines.

8. A recording liquid according to claim 1, wherein the content of said dyes is within the range of from 0.1 to 15% by weight of the total weight of the recording liquid.

9. A recording liquid according to claim 1, wherein the recording liquid is a black recording liquid.

10. An ink-jet recording process comprising making a record by applying droplets of a recording liquid to a recording medium having a pigment-coated layer, wherein said recording liquid comprises:
(a) a black dye selected from the group consisting of C.I. Food Black 1, C.I. Acid Black 140 and C.I. Acid Black 187; and
(b) at least one water soluble dye selected from the group consisting of a magenta dye and a yellow dye, wherein said black dye is present in a proportion from 40 to 95% by weight based on the total weight of said dyes in said recording liquid.

11. An ink-jet recording process according to claim 9, wherein said pigment-coated layer comprises silica having a specific surface area of from 35 to 650 m²/g.

12. An ink-jet recording process according to claim 9, wherein said black dye is contained in a proportion of from 45 to 90% by weight based on all the dyes contained in said recording solution.

13. An ink-jet recording process according to claim 9, wherein said recording liquid comprises water and a water-soluble organic solvent.

14. An ink-jet recording process according to claim 13, wherein said water-soluble organic solvent is selected from the group consisting of glycerol and polyethylene oxide having a degree of polymerization of from 2 to 6.

15. An ink-jet recording process according to claim 13, wherein said water-soluble organic solvent is contained in an amount of from 2 to 65% by weight based on the total weight of the recording liquid.

16. An ink-jet recording process according to claim 9, wherein said yellow dye is selected from the group consisting of C.I. Direct Yellow 86, C.I. Direct Yellow 142 and C.I. Acid Yellow 23.

17. An ink-jet recording process according to claim 9, wherein said magenta dye is selected from the group consisting of C.I. Direct Red 227 and a dye represented by the following Formula (A):

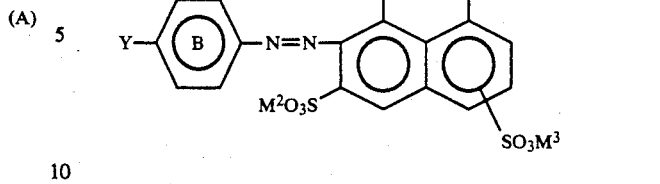

wherein Y represents a hydrogen atom, a methyl group, a methoxy group, an acetylamino group or a nitro group, or Y forms a benzene ring together with the carbon atom at the 3-position of the benzene ring B; X represents an acetyl group, a benzoyl group, a p-toluenesulfonyl group or a 4-chloro-6-hydroxy-1,3,5-triazin-2-yl group; and $M^1$, $M^2$ and $M^3$ each represent a base selected from the group consisting of an alkali metal, ammonium and amines.

18. An ink-jet recording process according to claim 9, wherein the recording liquid is a black recording liquid.

19. An ink-jet recording process according to claim 9, wherein said droplet is formed by the action of heat energy.

20. A recording liquid comprising dyes and a liquid medium for dissolving the dye, wherein said dyes comprise a black dye, a magenta dye and a yellow dye, said black dye being selected from the group consisting of C.I. Food Black 1, C.I. Acid Black 140 and C.I. Acid Black 187, and contained in a proportion of from 40 to 95% by weight based on the dyes.

21. A recording liquid according to claim 18, wherein said liquid medium comprises water and a water-soluble organic solvent.

22. A recording liquid according to claim 18, wherein said water-soluble organic solvent is selected from the group consisting of glycerol and polyethylene oxide having a degree of polymerization of from 2 to 6.

23. A recording liquid according to claim 18, wherein said water-soluble organic solvent is contained in an amount of from 2 to 65% by weight based on the total weight of the recording liquid.

24. A recording liquid according to claim 18, wherein said yellow dye is selected from the group consisting of C.I. Direct Yellow 86, C.I. Direct Yellow 142 and C.I. Acid Yellow 23.

25. A recording liquid according to claim 18, wherein said magenta dye is selected from the group consisting of C.I. Direct Red 227 and a dye represented by the following Formula (A):

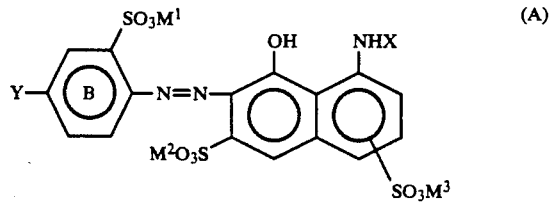

wherein Y represents a hydrogen atom, a methyl group, a methoxy group, an acetylamino group or a nitro group, or Y forms a benzene ring together with the carbon atom at the 3-position of the benzene ring B; X represents an acetyl group, a benzoyl group, a p-toluenesulfonyl group or a 4-chloro-6-hydroxy-1,3,5-triazin-2-yl group; and $M^1$, $M^2$ and $M^3$ each represent a base selected from the group consisting of an alkali metal, ammonium and amines.

26. A recording liquid according to claim 18, wherein the content of said dyes is within the range of from 0.1 to 15% by weight of the total weight of the recording liquid.

27. A recording liquid according to claim 18, wherein said black dye is contained in a proportion of from 45 to 90% by weight based on the dyes contained in said recording liquid.

28. A recording liquid according to claim 18, wherein the recording liquid is a black recording liquid.

* * * * *

UNITED STATES PATENT AND TRADEMARK OFFICE
CERTIFICATE OF CORRECTION

PATENT NO. : 5,017,227

DATED : May 21, 1991

INVENTOR(S) : Shoji Koike et al.

It is certified that error appears in the above-identified patent and that said Letters Patent is hereby corrected as shown below:

COLUMN 1:

Line 62, "C.I. Food black 2" should read --C.I. Food Black 2--.

COLUMN 2:

Line 13, "comprises" should read --comprise--.

COLUMN 3:

Line 28, "there is a case" should be deleted.

Line 29, "that" should be deleted and "is" should read --occurs--.

Line 34, "includes" should read --include--.

UNITED STATES PATENT AND TRADEMARK OFFICE
CERTIFICATE OF CORRECTION

PATENT NO. : 5,017,227

DATED : May 21, 1991

INVENTOR(S) : Shoji Koike et al.

It is certified that error appears in the above-identified patent and that said Letters Patent is hereby corrected as shown below:

COLUMN 7:

Table A, Example 15:

"

No. 15 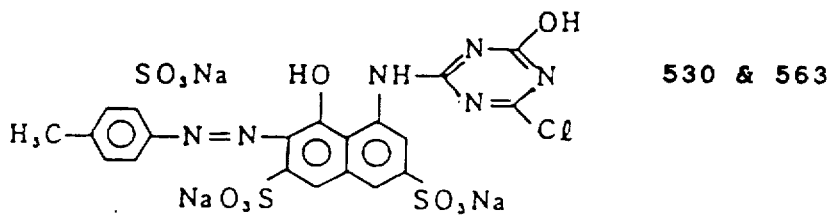 530 & 563 should read

--

No. 15 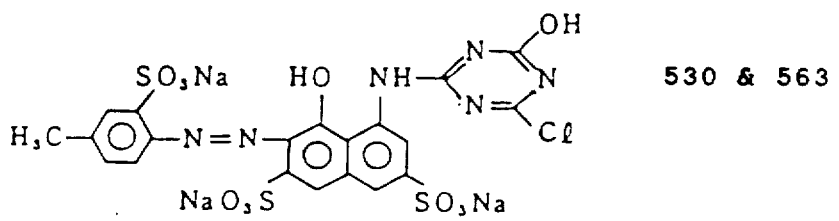 530 & 563

--.

UNITED STATES PATENT AND TRADEMARK OFFICE
CERTIFICATE OF CORRECTION

PATENT NO. : 5,017,227
DATED : May 21, 1991
INVENTOR(S) : Shoji Koike et al.

It is certified that error appears in the above-identified patent and that said Letters Patent is hereby corrected as shown below:

COLUMN 14:

Line 61, "Ltd." should read --Ltd.)--.

COLUMN 15:

Line 68, "afger" should read --after--.

COLUMN 16:

Line 10, "RMB" should read --RMA--.

Line 59, "claim 4," should read --claim 3,--.

COLUMN 17:

Line 41, "claim 9," should read --claim 10,--.

Line 44, "claim 9," should read --claim 10,--.

Line 48, "claim 9," should read --claim 10,--.

Line 61, "claim 9," should read --claim 10,--.

Line 65, "claim 9," should read --claim 10,--.

UNITED STATES PATENT AND TRADEMARK OFFICE
CERTIFICATE OF CORRECTION

PATENT NO. : 5,017,227
DATED : May 21, 1991
INVENTOR(S) : Shoji Koike et al.

It is certified that error appears in the above-identified patent and that said Letters Patent is hereby corrected as shown below:

COLUMN 18:

Line 20, "claim 9," should read --claim 10,--.

Line 22, "claim 9," should read --claim 10,--.

Line 32, "claim 18," should read --claim 20,--.

Line 35, "claim 18," should read --claim 20,--.

Line 39, "claim 18," should read --claim 20,--.

Line 43, "claim 18," should read --claim 20,--.

Line 47, "claim 18," should read --claim 20,--.

COLUMN 19:

Line 3, "claim 18," should read --claim 20,--.

Line 7, "claim 18," should read --claim 20,--.

UNITED STATES PATENT AND TRADEMARK OFFICE
CERTIFICATE OF CORRECTION

PATENT NO. : 5,017,227

DATED : May 21, 1991

INVENTOR(S) : Shoji Koike et al.

It is certified that error appears in the above-identified patent and that said Letters Patent is hereby corrected as shown below:

COLUMN 20:

Line 4, "claim 18," should read --claim 20,--.

Signed and Sealed this

Twenty-ninth Day of December, 1992

Attest:

DOUGLAS B. COMER

Attesting Officer

Acting Commissioner of Patents and Trademarks